United States Patent [19]

Metcalfe

[11] 4,171,832
[45] Oct. 23, 1979

[54] RELAXING JOINTS

[75] Inventor: Arthur G. Metcalfe, San Diego, Calif.

[73] Assignee: International Harvester Company, Chicago, Ill.

[21] Appl. No.: 742,338

[22] Filed: Nov. 16, 1976

[51] Int. Cl.² ............................................. F16L 53/00
[52] U.S. Cl. ........................................ 285/41; 165/81; 277/26; 277/135; 428/428; 428/433; 428/434; 285/187; 285/423; 285/DIG. 12; 285/DIG. 16
[58] Field of Search ................... 285/10, 11, DIG. 12, 285/284, 41, 114, 187, 291, 374, DIG. 16, 423; 277/26, 27, 135, 237; 165/81; 156/294; 428/428, 433, 434; 415/115; 65/43

[56] References Cited

U.S. PATENT DOCUMENTS

| | | | |
|---|---|---|---|
| 1,070,614 | 8/1913 | Kraus | 285/397 X |
| 1,639,575 | 8/1927 | Robinson | 285/DIG. 12 |
| 2,169,194 | 8/1939 | Geyer et al. | 285/DIG. 12 |
| 2,207,813 | 7/1940 | McMahon et al. | 285/DIG. 12 |
| 2,398,788 | 4/1946 | Hedrick | 285/41 X |
| 3,024,300 | 3/1962 | Martin | 285/DIG. 12 |
| 3,129,727 | 4/1964 | Tonaka | 285/DIG. 12 |
| 3,143,364 | 8/1964 | Klein | 285/291 X |
| 3,170,482 | 2/1965 | Wiloff | 277/135 X |
| 3,279,532 | 10/1966 | Pfeil | 165/81 |
| 3,327,777 | 6/1967 | Kovolik et al. | 165/81 |
| 3,667,785 | 6/1972 | Kapeker | 285/DIG. 12 |
| 3,966,353 | 6/1976 | Booher | 415/115 |

FOREIGN PATENT DOCUMENTS 1078580  5/1954  France .................................. 285/297

Primary Examiner—Dave W. Arola
Attorney, Agent, or Firm—Strauch, Nolan, Neale, Nies & Kurz

[57] ABSTRACT

Joints for limiting the stresses on non-ductile components and structures, and methods for fabricating such joints.

16 Claims, 11 Drawing Figures

RELAXING JOINTS

The present invention relates to the joining of ceramic and other non-ductile components and structures and, more specifically, to novel, improved techniques and joint constructions for limiting stresses on such components and structures while providing a seal therebetween.

In recent times increasing attention has been devoted to the substitution of high performance ceramics for metals in a variety of engineering structures.

Silicon carbide and silicon nitride ceramics, for example, can be employed at much higher service temperatures than even the most exotic of the superalloys, the best of the currently available, economically practical metals from the viewpoint of high temperature strength.

One application where high performance ceramics possess a potential beyond superalloys is in high temperature heat exchangers—for example, in units for heating the inlet gases for indirectly fired gas turbines. This application is important because such turbines have the potential for making more efficient use of available energy resources. They can be operated on coal and other non-conventional fuels and on waste heat from stack gases and other sources. Also, because the critical, high temperature components of an indirect fired turbine are exposed only to clean gases and not to combustion products, hot corrosion problems essentially disappear, providing the potential for substantial reductions in maintenance costs.

To date the highest temperature achieved in a long-life gas turbine heat exchanger is 1300° F. This is well below the 1800° F. inlet temperature required to provide a level of thermal efficiency that would make an indirect fired gas turbine practical.

High performance ceramics, in contrast, remain useful at temperatures at high as 2500 plus degrees Fahrenheit making heat exchangers fabricated on such materials and capable of heating turbine inlet gases to 1800° F. and higher well within reach. Furthermore, at elevated operating temperatures, high performance ceramics are superior to alternate candidates in areas such as expansivity, thermal conductivity, corrosion and erosion resistance, and long-term strength.

Another advantage of high performance ceramics is that they are compounded from materials which are universally available in large quantity. Superalloys, in contrast, are composed in large proportions of nickel and other imported, and scarce, strategic metals.

High temperature ceramic tube heat exchanges represent a technology void. One reason is the lack of a suitable technique for joining ceramic components in a manner suitable for high temperature, dynamic structures. This is because the joint requirements are extremely difficult to reconcile.

Ceramics are brittle, non-ductile materials. Consequently, provision must be made for components to move relative to each other. Otherwise, stresses arising from differential heating rates and thermal expansivities under non-static temperature conditions will cause the components to fail as the components are not capable of absorbing the stresses.

At the same time highly effective seals are essential in structures such as heat exchangers where a mass transfer of gases is involved. For example, in a system having a gas turbine supplied with working fluid from a ceramic tube-and-shell heat exchanger, it can be shown that each one percent leakage of working fluid from the exit side of the heat exchanger will result in a 2.8 percent loss of horsepower from the turbine. Minimization of leakage is accordingly essential.

In addition it is necessary that the joint be one which it is practical to fabricate as a structure such as a shell-and-tube heat exhanger may require several hundred or more such joints. Because of the large number of joints which may be involved and other reasons including the cost of downtime, it is also essential that the joint construction be one which has a reasonably long service life and that it permit replacement of failed components.

Heretofore, joints operating at high, fluctuating temperatures which would meet the requirements stated in the preceding paragraphs have not been available. In fact a search through several hundred thousand entries in the appropriate indexes revealed only two references dealing at all with prime surface, ceramic tube heat exchangers.

I have now intented novel techniques for joining ceramic components intended for high temperature applications which have the features pointed out above to be necessary. The joints I have intended also have the advantage that their characteristics can be altered to the extent needed to optimize their performance in a variety of highly diverse applications.

In general the novel joints I have invented involve placing between the ceramic components being joined a material which will yield and allow the components to move relative to each other before unacceptable stress levels are reached.

Two approaches are employed. One is the use of a load sensitive or compliant interlayer between the components to relieve stress, the other the placing of a time-load sensitive or viscous adhesive between the components for this purpose. In general a compliant interlayer will typically be employed where a one-time attenuation of localized contact stresses such as can result from a manufacturing misfit or other cause of uneven loading is involved. Where periodic deformation of the filler is involved because of temperature cycling, for example, a time-load sensitive filler will usually be selected.

In general the requirements for a compliant interlayer material are that it have a suitable stress-strain curve over the service temperature range of the joint and that it be compatible with the ceramic components in expansion and oxidation characteristics.

Suitable materials for low temperature applications include copper and silver. Silicided columbium can be used at temperatures up to 2200° F.; and low creep strength, hot pressed silicon nitrides with high contents of glass formers can be used for the highest temperature applications.

The use of a viscous adhesive to reduce stresses between two ceramic components results in what I term a relaxing joint. Such joints can be utilized to attenutate both normal and shear stresses.

The adhesive filler may be metallic or a glass. It is used primarily in shear and in such a manner that all loads between the two components being joined are transmitted through the filler.

Stresses in glass-filled relaxing joints are relieved by viscous flow of the glass. Consequently the major criterion in selecting a glass for a particular relaxing joint application is the viscosity of the glass over the temperature range to which the joint will be subjected in use. The viscosity must be low enough that it will flow and permit the components being joined to move relative to each other and prevent a build-up of stresses as the service temperature increases and differential expansion of the components occurs. At the same time the viscosity of the glass must be high enough at the service temperatures that it will withstand expulsion from the joint long enough for the joint to have a useful service life.

It is also important that the filler material be capable of wetting the ceramics between which it is disposed in order to establish a bond with the ceramic. In fact I prefer to employ a filler which will chemically react with the ceramic to a small degree to insure wetting rather than relying on physical effects alone.

Also, compositions which favor crystallization (devitrification) are to be avoided. This requires that the composition be free from copper, noble metals, titanium dioxide, phosphorous pentoxide, halides, and other additives which promote phase separation.

Particularly preferred as high silica glasses containing boric acid and other strong glass formers. Also, inert fillers such as chromic oxide and silicon nitride may be used.

In joints employing metallic-based adhesives stresses are relaxed by creep or creep and flow of the material. The criteria for such adhesives are generally the same as for those adhesives based on glasses. The filler must allow the components to move relative to each other to prevent design stresses from being exceeded yet resist expulsion to maintain a gastight seal for a period of reasonable duration. Also, care must be taken to avoid materials which will crack under the high differential contractions which can occur upon cooldown of the joint.

One suitable class of materials is that the braze alloys, especially the widely available Ni-Cr-Si-B alloys.

Metal foils can also be used with heat and pressure being applied after the joint has been assembled to bond the filler to the ceramic components and form a seal therebetween. Commonly available foils that can be used include those of Ni-20Cr and Fe-15Cr-5Al.

One advantage of the metallic adhesives available in foil form is their ductility. Because of this property, such materials have the capability of arresting cracks at the interface between the filler and the ceramic component in which the crack occurs.

As indicated above, the filler material must be capable of wetting the surface of the components between which it is disposed. If necessary, small amounts of an active material (e.g., less than one percent of titanium) can be incorporated in the basic composition for this purpose.

Another approach to obtaining good wettability is to modify the surface of the ceramic, either prior to forming the joint or by reaction with the compliant interlayer material or metallic or glass-based adhesive.

Joints which have both a compliant interlayer and a metallic or glass-based adhesive can be employed where conditions warrant.

Also, in many applications of my invention I find it useful to provide a reservoir of filler material in a relaxing joint. This material can be made to replace that expelled from the joint by internal pressures, for example, materially extending the service life of the joint.

Several important advantages of my novel techniques for joining ceramic components have been discussed above or will be apparent from the discussion. Another important advantage which my novel constructions possess is a capability for on-site fabrication and repair.

Ceramics which it becomes feasible to use because of the stress-attenuated, gastight joints that can be fabricated by application of the principles described above include reaction bonded silicon nitrides, silicon-containing silicon carbides, and sintered silicon carbides.

From the foregoing it will be apparent to the reader that one important and primary object of the present invention resides in the provision of novel techniques and constructions for joining ceramic components, especially those intended for applications where differential expansion and/or contraction between the joined components may occur.

Related and also important objects of the invention reside in the provision of techniques and constructions in accord with the preceding object:

(1) which are capable of limiting the build-up of stresses in the components to an acceptable level while maintaining a gastight seal between the ceramic components;

(2) which are capable of meeting the foregoing objectives in applications involving repeated temperature cycling;

(3) which involve the use of a load sensitive or compliant interlayer between the ceramic components to attenuate stress build-ups;

(4) which involve the use of a time-load sensitive material which is viscous or will creep at elevated temperatures between the ceramic components to attenuate stress build-ups;

(5) which, in conjunction with the preceding object, involve the use of a reservoir of the time-load sensitive material to replenish the material between the ceramic materials and thereby produce an extended service life;

(6) which can be employed on-site if desired;

(7) which are useful in applications requiring a one-time attenuation of stresses such as those attributable to a manufacturing misfit, for example; in applications requiring repeated stress attenuation because of temperature cycling, for example; and in applications requiring both of the foregoing capabilities;

(8) which have various combinations or all of the foregoing attributes and capabilities.

Other important objects and features and additional advantages of the present invention will become apparent from the appended claims and as the ensuing detailed description and discussion proceeds in conjunction with the accompanying drawing, in which:

Figure 1:
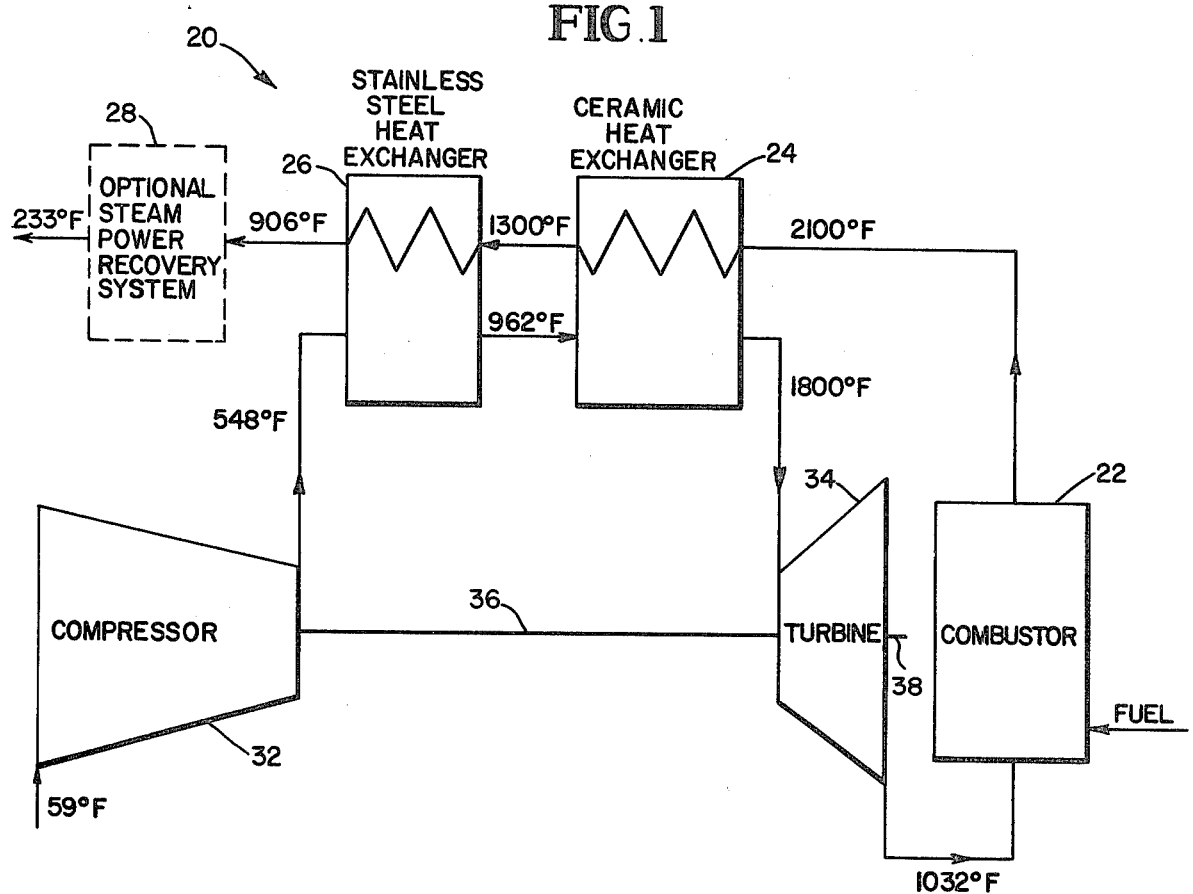
FIG. 1 is a schematic view of an indirectly fired turbine engine.

Referring now to the drawing, an exemplary application of my invention is the fabrication of high temperature heat exchangers. It was pointed out above that such heat exchangers are necessary for the efficient operation of such otherwise advantageous systems as indirectly fired gas turbines.

A turbine of this character and equipped with a high temperature heat exchanger which may be constructed by employing the principles of the present invention is shown schematically in FIG. 1 and identified by reference character 20.

In the particular turbine shown in FIG. 1 coal is burned in a combustor 22. The combustion products are circulated through the tube side of a high temperature, ceramic shell and tube heat exchanger 24, then through the tube side of a second heat exchanger 26 of the shell and tube type. Heat exchanger 26 may be fabricated of a material such as a stainless steel as it required to withstand only temperatures several hundred degrees lower than those which heat exchanger 24 must.

The combustion products discharged from heat exchanger 26 will still have a temperature of several hundred degrees Fahrenheit. Accordingly, to recover additional energy, they may be circulated from the heat exchanger 26 through a steam generator or power recovery system identified generally by reference character 28.

Turbine 20 also includes a compressor 32 driven from a turbine section 34 via a diagrammatically illustrated drive shaft 36. Air is employed as the working fluid for turbine section 34.

This air is compressed and heated to some extent by compressor 32 and then circulated first through the tube side of low temperature heat exchanger 26 and then through the tube side of high temperature heat exchanger 24 in both cases in counterflow relationship to the combustion products from combustor 22. This increases the air temperature to 1800° F. or higher.

The hot compressed air is then expanded through turbine section 34. Part of the energy developed from the expanding gas is employed to drive compressor 32; the remainder is available at turbine output shaft 38.

As the air discharged from the turbine will still contain significant amounts of sensible heat, it is preferably recirculated to combustor 22 and employed as combustion air.

Figure 2:
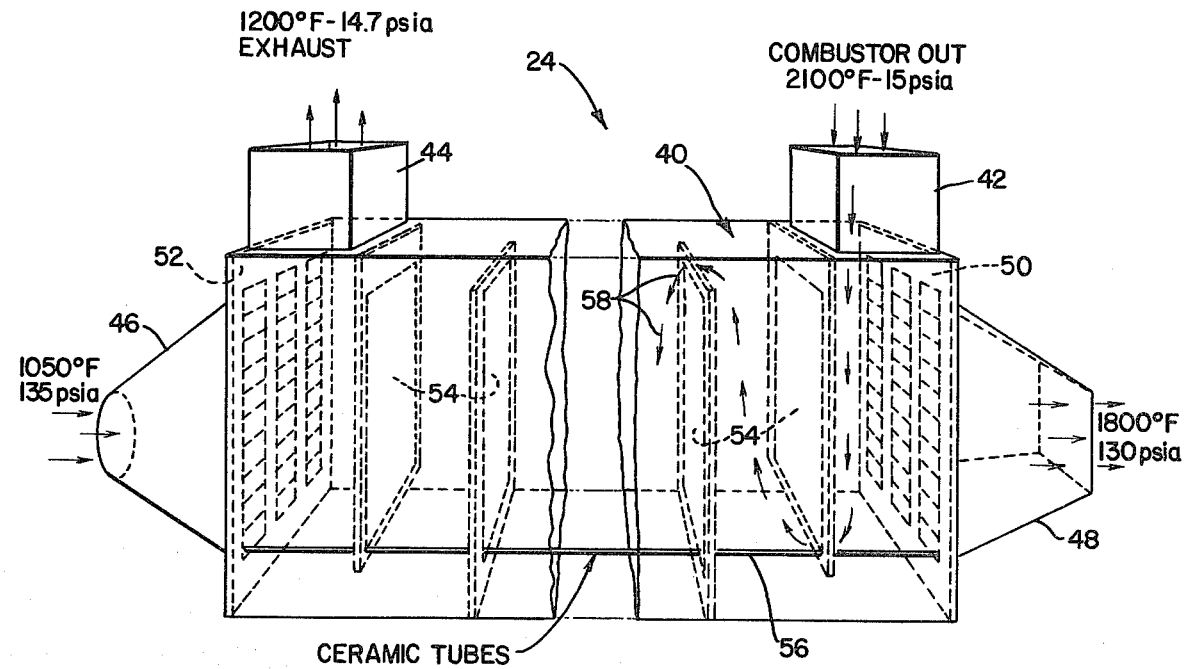
FIG. 2 is a pictorial view of an exhaust gas heated, ceramic tube heat exchanger which can be employed in the turbine engine of FIG. 1.

High temperature, ceramic heat exchanger 24, shown in more detail in FIG. 2, includes a housing 40 with an inlet 42 and outlet 44 for combustion products from combustor 22 and an inlet 46 and outlet 48 for the working fluid.

Housing 40 may be a steel casing with a non-structural, ceramic inner liner of furnace brick, for example.

An inlet header 50 and an outlet header 52 are supported at the ends of housing 40 and adjacent working fluid inlet 46 and outlet 48, respectively. Supported by the inlet and outlet headers and baffles 54 and extending between the inlet and outlet headers are heat exchanger tubes 56 (only one of which is shown).

The inlet and outlet headers, the baffles, and the heat exchange tubes are fabricated from a ceramic, typically one of those identified above.

One heat exchanger of the type shown in FIG. 2 is designed to employ 500, 30 foot long, one-inch diameter tubes, making a total tube length of 15,000 feet.

Because of the difficulty of making monolithic headers from ceramics in the dimensions required, they are preferably constructed of segments, each header/tube module containing 20 tubes.

The operation of heat exchanger 24 is typical of a heat exchanger of the shell and tube type. Air entering the heat exchanger through inlet 46 flows into and through tubes 56 and is discharged through outlet 48. As it traverses the heat exchanger its temperature is increased by combustion products which enter the heat exchanger through inlet 42, flow through it in counterflow relationship to the air, and are discharged through outlet 44. Baffles 54 are supported from the top and bottom walls of the heat exchanger housing. Gaps between the baffles and the top and bottom housing walls force the hot combustion products to follow the serpentine path indicated by arrows 58 and heat all of the ceramic tubes 56.

As the internal components of heat exchanger 24 are heated to operating temperature, inlet and outlet headers 50 and 52 and ceramic tubes 56 expand longitudinally of the heat exchanger at different rates and to different extents. The differential expansion cannot be accommodated in the headers or in the tubes because of their non-elastic nature, and separate provision must be made for accommodating the differential expansion. Otherwise, overstressing and failure of the tubes and/or headers will result.

At the same time, it is essential that the working fluid (or air) be kept from leaking through the joints between the headers and the tubes. As discussed above, very small leakages can result in disproportionately large drops in the efficiency of a turbine such as that shown in FIG. 1.

Figure 3:
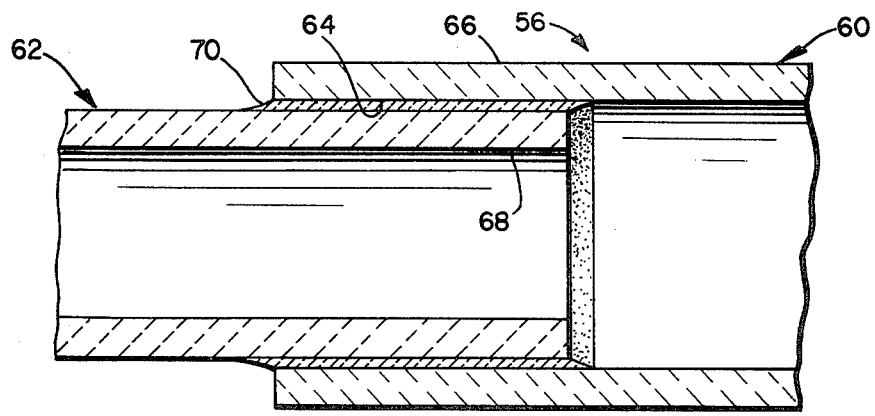
FIG. 3 is a partial longitudinal section through one tube of the heat exchanger of FIG. 2 showing a lap-type, relaxation joint in accord with the principles of the present invention for limiting the stresses imposed on the components of the tube.

One joint construction in accord with the principles of the present invention which can be employed to keep stresses from exceeding design levels while making it possible to maintain gastight seals between the tubes and headers is shown in FIG. 3.

In the construction shown in FIG. 3, each of the ceramic heat exchange tubes 56 is composed of telescoped segments 60 and 62. The annular gap 64 between the overlapping ends 66 and 68 of the segments is filled with an adhesive material identified generally by reference character 70. This filler is either a metal or glass adhesive with the characteristics discussed above.

Accordingly, as the tubes are heated, the material 70 between the tube segments flows because of creep or a reduction in viscosity, allowing tube segment 62 to expand to the left as shown in FIG. 2 and segment 60 to expand to the right. This prevents the buildup of stresses in the tube segments and in the inlet and outlet headers. At the same time material 70 remains viscous enough to keep working fluid from leaking into the shell side of heat exchanger 24 through the gap 64 between the tube segments.

Relative movement between the tube segments to attenuate stresses is similarly made possible when the tube segments cool and differential contraction occurs.

If a brazing alloy or other metallic adhesive filler is employed, the joint as shown in FIG. 3 can be formed in much the same manner as brazing. A process similar to diffusion bonding and described above can be employed if the filler is in the form of a foil.

If a glass adhesive is employed, the material is first preferably reduced to 1-10 micron particle size as by ball milling a glass frit of appropriate composition. The powdered material is suspended in a liquid vehicle to form a slurry which is induced into the gap between the components being joined by immersing the joint in the slurry and then evacuating the interior of the tube.

The joint is dried and then fired at a temperature which is appropriate for the glass being used. Typically, the firing temperature will be 200°-400° C. above the operating temperature for the joint. Firing may be accomplished in a furnace or by heating the joint area with a torch, induction heater, or other heater. Because the heat can be supplied by a readily portable heat source, the joint fabrication technique just described makes in situ or field fabrication and repair of joints practical.

As indicated above, the filler material must meet two criteria. It must provide adequate relaxation and at the same time provide an adequate gas seal. This means first that the viscosity of the glass must be low enough at the minimum temperature at which unacceptable stress levels would otherwise be reached to provide adequate relaxation. Second, the viscosity must be high enough at the maximum operating temperature for the material to remain in the joint and maintain an adequate gas seal.

Viscosity curves are available for a variety of glasses and can be readily developed where they are not. From its viscosity curve, the temperature range over which a candidate material will be operable can be readily determined. The particular glass shown in FIG. 11, for example, would be suitable for joints operating in environments where the temperature ranges from approximately 800° to 1000° C. (1470°-1830° F.).

Figure 11:
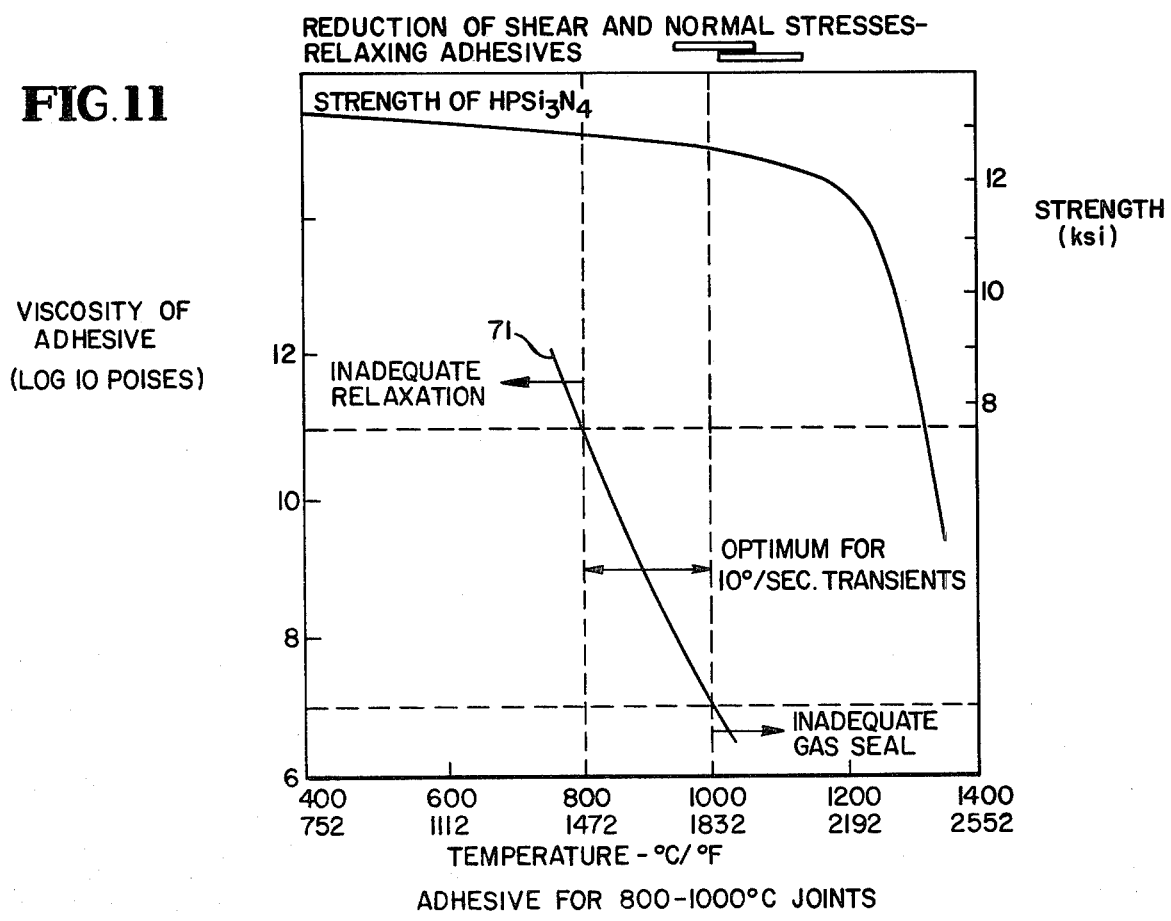
FIG. 11 shows in graphical form the principles involved in selecting fillers for relaxing joints employing the principles of the present invention.

Curve 71 of FIG. 11 is typical of a viscosity curve for an alumina silicate glass.

Longer tubes can be made by increasing the number of tube segments. If this is done, it is preferred that all stress attenuation be accomplished with a minimum of relaxing joints and that the remaining joints be of a rigid or non-relaxing character. Mechanical ratcheting can become a problem if relaxing joints are employed in series.

It is preferred that the joint be located near the hot end of the heat exchanger. This accelerates heating of the joint on start-up, insuring that it functions as intended.

It is not necessary that stresses be attenuated in the particular manner shown in FIG. 3. An alternate scheme employs a relaxing joint 72 between each of the tubes 56 and the header 50 at the hot end of the heat exchanger (i.e., the end at which combustion produces inlet 42 is located). In this joint (shown in FIG. 4) tube 56, which may be a monolithic character or composed of segments connected by non-relaxing joints, extends through an aperture 74 in header 52. The annular gap 76 between the tube and the header is filled with a metal or glass filler or adhesive of the character described above. As in the joint shown in FIG. 3, the filler relaxes and prevents the build-up of stresses in the tube and header as the temperature of these components is elevated and differential expansion occurs.

Figure 4:
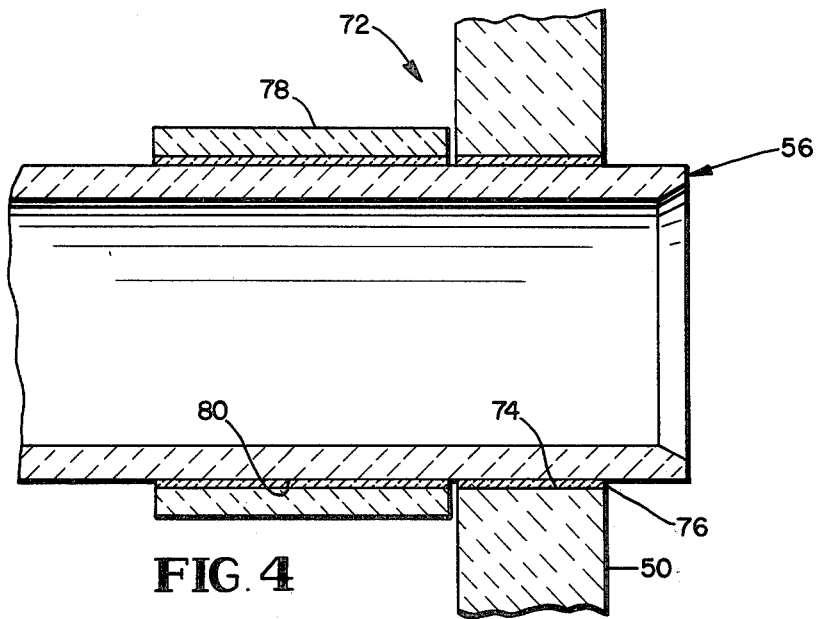
FIG. 4 is a sectional view of one form of relaxation joint which can be used between the tubes and headers of heat exchangers such as that shown in FIG. 2 to attenuate stresses.

As shown in FIG. 4, tube 56 is surrounded by a sleeve 78 adjacent the inner side of header 52. Sleeve 78 is a positioning device and keeps tube 56 from "walking" through header 50 as it could otherwise do in the course of plural cycles in operating temperatures.

The annular gap 80 between sleeve 78 and tube 56 is filled with glass which will not flow under operating conditions to join the tube and sleeve.

Figure 5:
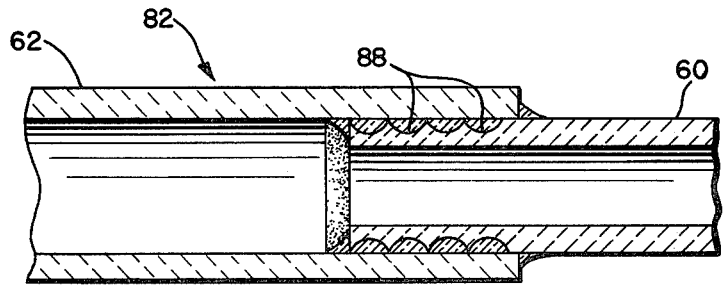
FIGS. 5-7 are views similar to FIG. 3 of alternate forms of lap-type relaxation joints in accord with the principles of the present invention.

I pointed out above that extended service lives can be obtained by providing reservoirs from which filler material can be replenished as it is expelled as by internal pressures, for example. Joints of this character are illustrated in FIGS. 5, 6, and 7 and identified by reference characters 82, 84, and 86.

In joint 82 (FIG. 5) the reservoir is composed of radial scallops 88 in that end portion of inner tube segment 60 spanned by outer tube segment 62. Filler material flows from these scallops to replace filler expelled from the joint.

Figure 6:
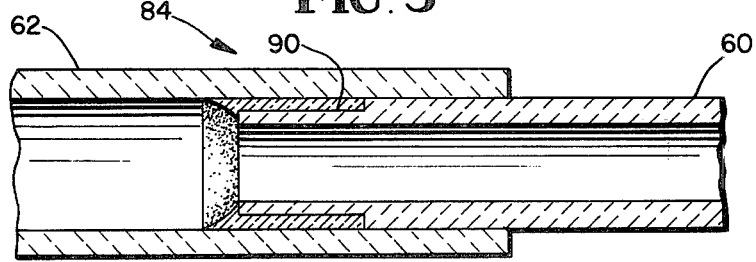
Figure 7:
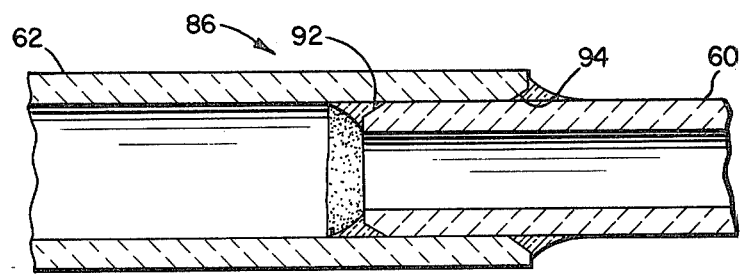

In the joint 84 shown in FIG. 6, the same result is obtained by way of a reservoir 90 which is an annular, external recess in the end of inner tube segment 60.

In joint 86 (see FIG. 7) two reservoirs 92 and 94 are provided by bevelling the ends of the two tube segments 60 and 62.

The use of reservoirs makes it possible to extend the service life of tube joints by up to approximately two orders of magnitude. Also, the range of viscosities which the filler material may have and still remain effective is greatly increased. This is important because the joint will thereby remain effective over an increased temperature range.

The tube segment end configurations necessary to provide the reservoirs shown in FIGS. 5-7 can be readily provided. For example, they can be slip-cast in silicon carbide or machined in the green state from silicon nitride and then reaction bonded.

Figure 8:
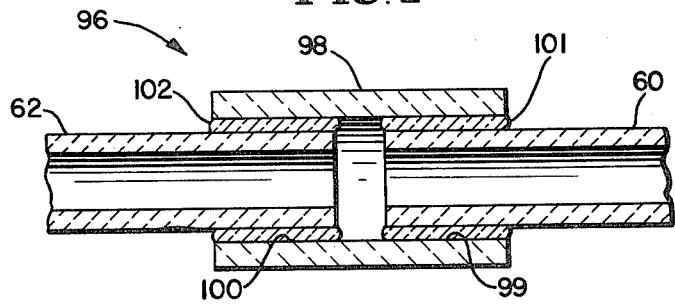
FIG. 8 is a view similar to FIG. 3 of a reinforced-butt relaxation joint in accord with the princples of the present invention.

FIG. 8 depicts yet another joint 96 in accord with the principles of the present invention. In it the two tube segments 60 and 62 fit within the ends of a tubular connector 98. The annular gaps 99 and 100 between the ends of the tube segments and the connector are filled as indicated by reference characters 101 and 102 with a filler material having the characteristics described above. Stresses are therefore attenuated by movement of the two tube segments relative to each other and to connector 98 as these components are heated and differential expansion occurs.

While it does involve the use of an additional component, joint 96 has the advantage that the dimensions of the tube segments in the joint are the same, thereby simplifying fabrication of the segments.

Figure 9:
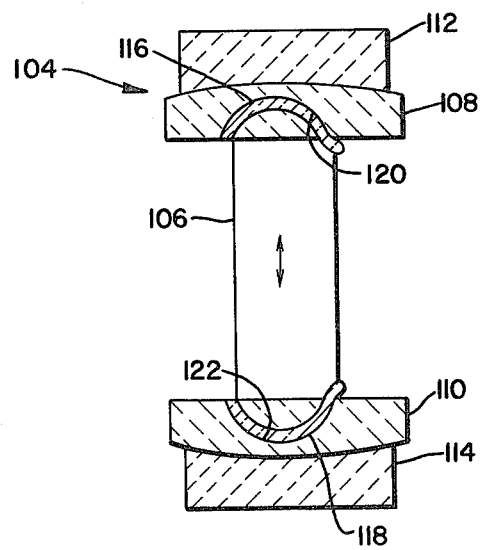
FIG. 9 is a section through a turbine stator vane assembly showing compliant interlayer joints between the vane and its end caps in accord with the provisions of the present invention.

Referring again to the drawing, FIG. 9 shows the use of a compliant interlayer in accord with the principles of the present invention to attenuate friction and contact stresses in a gas turbine stator vane assembly 104. The assembly includes a ceramic vane 106, ceramic end caps 108 and 110, and insulators 112 and 114. The details of the foregoing components are not part of the present invention; and they may be made as shown, for example, in U.S. Pat. No. 3,966,353 issued June 29, 1976, to Booher et al.

In the illustrated vane assembly, end caps 108 and 110 are required to take end, torque, and side thrust loads. Because of asperities and manufacturing misfits, high stresses are imposed upon the end caps and the vane as they are heated and differential expansion occurs.

Cracking or other deterioration can therefore readily occur.

In assembly 104, stress concentrations are reduced to an acceptable level by disposing interlayers 116 and 118 of a compliant material (several were identified above) between the spherical seats 120 and 122 in the end caps and the ends of vane 106. As the temperature of the assembly is increased, the compliant material yields, permitting relative movement between the vane and the end caps and thereby avoiding stress build-ups.

The movements due to differences in temperature may be lateral; and these lateral movements generate friction stresses which are the most serious ones. Such stresses are attenuated by the compliant interlayers.

Figure 10:
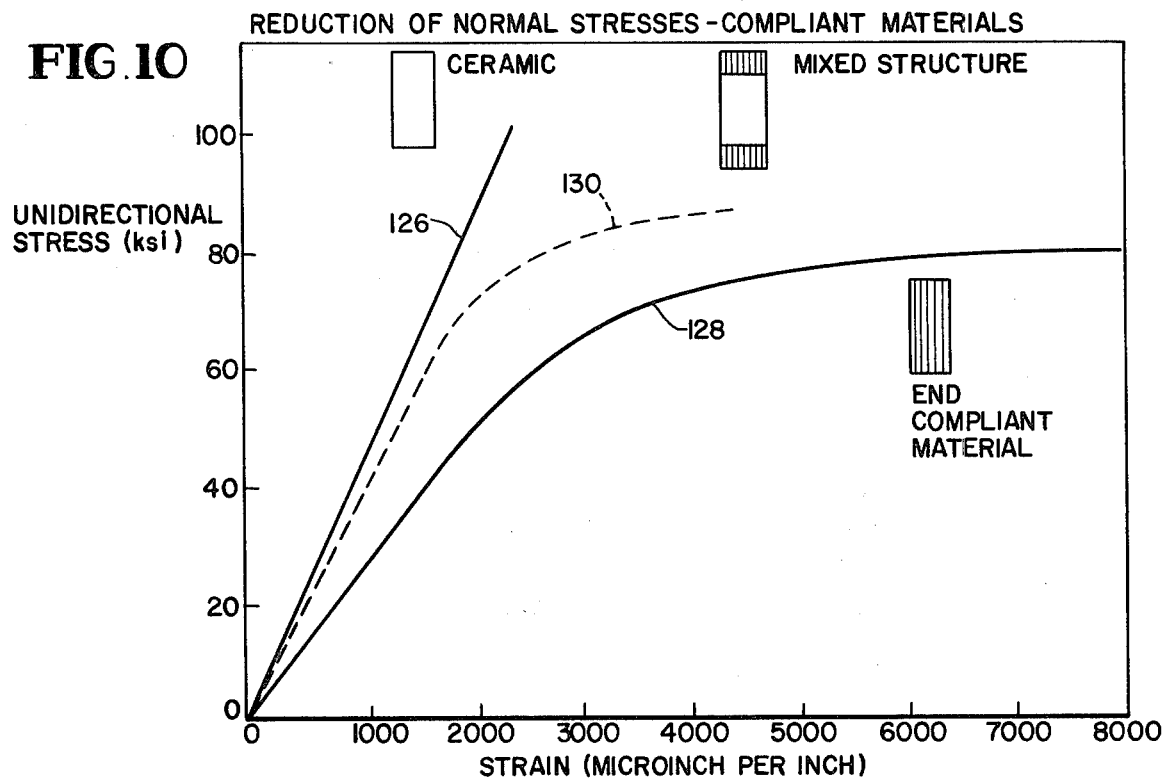
FIG. 10 shows in graphical form the advantages of employing compliant joints embodying the principles of the present invention.

The effectiveness of my novel compliant interlayer systems can be readily appreciated by reference to FIG. 10. As shown by curve 126 in that figure, only a small strain will cause a large increase in stress on a ceramic component having rigidly constrained ends. For a ceramic such as hot pressed silicon nitride, for example, a strain of only 2300 micro inches per inch will cause the unconstrained component to fracture. Strains of this magnitude are generated by temperature increases of only a few hundred degrees Fahrenheit.

In contrast, the stress in a compliant interlayer material in accord with the principles of the present invention increases only very slowly after a relatively small strain has been placed on the interlayer as shown by curve 128. Consequently, by replacing a small part of the ceramic component with a compliant material as shown by the "mixed structure" illustration, the composite will be given the stress-strain characteristics shown by curve 130. That is, as in the case of the compliant material alone, the stress on the mixed structure will increase only very slowly even though relatively high strains may be imposed, and the stress on the structure will remain well below fracture levels even under large strains.

For example, FIG. 10 shows that, even though a strain of several thousand microinches per inch may be imposed on the mixed structure shown in that figure and described above, the stress in the ceramic part of the mixed structure will never even approach the level at which fracture would occur.

The invention may be embodied in other specific forms without departing from the spirit or essential characteristics thereof. The present embodiments are therefore to be considered in all respect as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. The combintion of two juxtaposed, non-ductile, non-metallic components and a continuous body of material disposed between and separating said components and bonded thereto for limiting stresses on said components, said material being a low strength, glass or metallic adhesive that will flow under changing supra-ambient temperature conditions while remaining a continuous body and bonded to said components when subjected to stresses lower than those capable of causing fractures in said components.

2. A combination as defined in claim 1 in which the material disposed between the non-ductile components is time-load sensitive.

3. A combination as defined in claim 1 in which the material disposed between the non-ductile components is a load-sensitive compliant interlayer.

4. A combination as defined in claim 1 in which the material disposed between and in bonded relationship with said non-ductile components to provide a seal therebetween consists essentially of one of the group consisting of copper/silver alloys, stainless steels, austenitic steels, silicide coated columbium, and high glass silicon nitrides.

5. A combination as defined in claim 1 in which the material is a glass adhesive and in which said glass adhesive is essentially free of devitrification promoting additives and comprises at least one strong glass former.

6. The combination of a device having two non-ductile, non-metallic components; means for changing the temperature of said components from a first to a second temperature; and means for attenuating stresses in said components as their temperature changes and differential expansion or contraction of the component occurs, said last-mentioned means comprising a glass or metallic adhesive of sufficient plasticity to permit said components to move relative to each to attenuate the stresses generated by said differential expansion or contraction, said adhesive being disposed in a continuous body between and interfacing in bonded relationship with said components to provide a seal therebetween.

7. A combination as defined in claim 6 in which the material disposed between the non-ductile components is time-load sensitive.

8. A combination as defined in claim 6 in which the material disposed between the non-ductile components is a load-sensitive compliant interlayer.

9. A combination as defined in claim 6 in which the material disposed between the non-ductile components consists essentially of one of the group consisting of copper/silver alloys, stainless steels, austenitic steels, silicide coated columbium, and high glass silicon nitrides.

10. A combination as defined in claim 6 in which the material disposed between the non-ductile components is a glass adhesive and in which said glass adhesive is essentially free of devitrification promoting additives and comprises at least one strong glass former.

11. The method of limiting the stresses on two juxtaposed, non-ductile, non-metallic components, said method including the step of disposing between, bonding to, and separating said components by a continuous body of a low strength glass or metallic adhesive that will flow under changing supra-ambient temperature conditions while remaining a continuous body and bonded to said components when subjected to stresses lower than those capable of causing fractures in said components.

12. A method as defined in claim 11 in which the material disposed between the non-ductile components is time-load sensitive.

13. A method as defined in claim 11 in which the material disposed between the non-ductile components is a load-sensitive compliant interlayer.

14. A method as defined in claim 11 in which the material disposed between the non-ductile components consists essentially of one of the group consisting of copper/silver alloys, stainless steel, austenitic steels, silicide coated columbium, and high glass silicon nitrides.

15. A method as defined in claim 11 in which the material disposed between the non-ductile components is a glass adhesive and in which said glass adhesive is essentially free of devitrification promoting additives and comprises at least one strong glass former.

16. The combination of two non-ductile components; a material disposed in a space between and interfacing with said components to provide a seal therebetween, said material being plastic and remaining a continuous body providing a seal between said components under conditions involving changing supra-ambient temperature conditions and a differential expansion of the non-ductile components, whereby said components can move relative to each other to inhibit the build-up of stresses in said components without disrupting the seal therebetween; and reservoir means in at least one of the non-ductile components from which material expelled from the joint can be replenished; said reservoir being filled with said material and being in communication with the space between said components.

* * * * *

UNITED STATES PATENT AND TRADEMARK OFFICE
CERTIFICATE OF CORRECTION

PATENT NO. : 4,171,832
DATED : October 23, 1979
INVENTOR(S) : ARTHUR G. METCALFE It is certified that error appears in the above-identified patent and that said Letters Patent are hereby corrected as shown below:

Column 1, line 39, change "at" (second occurrence) to --as--.
Column 1, line 40, change "on" to --of--.
Column 3, line 19, change "as" to --are--.
Column 3, line 34, after "that" insert --of--.
Column 5, line 44, change "tube" to --shell--.
Column 5, line 45, change "tube" to --shell--.
Column 5, line 62, after "fluid." insert --Figure 2 also depicts an alternate fluid flow arrangement in that the combustion products circulate through the shell side of the exchanger while the working fluid circulates through the tube side thereof.--.
Column 7, line 57, change "50" to --52--.
Column 8, line 4, change "50" to --52--.
Column 8, line 17, change "60" to --62--; change "62" to --60--.
Column 8, line 22, change "60" to --62--.
Column 8, line 41, cancel "60 and" and substitute --like those identified by reference character--.

UNITED STATES PATENT AND TRADEMARK OFFICE
CERTIFICATE OF CORRECTION

PATENT NO. : 4,171,832

DATED : October 23, 1979

INVENTOR(S) : ARTHUR G. METCALFE

It is certified that error appears in the above-identified patent and that said Letters Patent are hereby corrected as shown below:

Column 9, line 56, change "combintion" to --combination--.
Column 9, line 66, change "clain" to --claim--.
Column 10, line 29, change "material" to --adhesive--.
Column 10, line 32, change "material" to --adhesive--.
Column 10, line 35, change "material" to --adhesive--.
Column 10, line 41, change "material" to --adhesive--.
Column 10, line 56, change "material" to --adhesive--.
Column 10, line 59, change "material" to --adhesive--.
Column 10, line 62, change "material" to --adhesive--.
Column 10, line 68, change "material" to --adhesive--.
Figure 2 --change reference character "50" to --52-- and vice-versa.
Figure 4 --change reference character "50" to --52--.
Figures 5, 6, and 7 --change reference character "60" to --62-- and vice-versa.
Figure 8 --change reference character "60" to --62--.

Signed and Sealed this

Ninth Day of September 1980

[SEAL]

Attest:

SIDNEY A. DIAMOND

Attesting Officer

Commissioner of Patents and Trademarks